US010203528B2

(12) United States Patent
Yoo et al.

(10) Patent No.: US 10,203,528 B2
(45) Date of Patent: Feb. 12, 2019

(54) INTEGRATED POLARIZATION CONVERTER AND FREQUENCY SHIFTER

(71) Applicant: The Regents of the University of California, Oakland, CA (US)

(72) Inventors: Sung-Joo Ben Yoo, Davis, CA (US); Chuan Qin, Davis, CA (US); Burcu Ercan, Davis, CA (US); Hongbo Lu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/821,600

(22) Filed: Nov. 22, 2017

(65) Prior Publication Data

US 2018/0143465 A1 May 24, 2018

Related U.S. Application Data

(60) Provisional application No. 62/426,005, filed on Nov. 23, 2016.

(51) Int. Cl.
*G02F 1/035* (2006.01)
*G02F 1/03* (2006.01)

(52) U.S. Cl.
CPC ......... *G02F 1/0353* (2013.01); *G02F 1/0327* (2013.01); *G02F 2201/127* (2013.01); *G02F 2203/07* (2013.01)

(58) Field of Classification Search
CPC ............. G02F 1/0353; G02F 1/0327; G02F 2201/127; G02F 2203/07
See application file for complete search history.

(56) References Cited

U.S. PATENT DOCUMENTS

| 5,140,654 | A | * | 8/1992 | Akasaka | ............ G02F 1/0353 385/14 |
| 2014/0205229 | A1 | * | 7/2014 | Thaniyavarn | ........ G02F 1/225 385/3 |

* cited by examiner

*Primary Examiner* — John Bedtelyon
(74) *Attorney, Agent, or Firm* — Park, Vaughan, Fleming & Dowler LLP (57) ABSTRACT

An optical device is described. This optical device includes an electro-optical material having an X-cut, Y-propagate orientation. In particular, a Y crystallographic direction of the electro-optical material is parallel to an optical waveguide defined in the electro-optic material and an X crystallographic direction of the electro-optical material is parallel to a vertical direction of the optical device. By applying drive signals having an angular frequency to the electro-optic material, the optical device may perform modulation, corresponding to a traveling-wave configuration, of an optical signal based at least in part on the drive signals. where the modulation involves a polarization conversion and a frequency shift. The angular frequency of the drive signals may be selected to approximately cancel electro-optic cross terms in X-Z plane of the electro-optical material. Moreover, an amplitude of the drive signals may be selected so that the optical device emulates a half-wave-plate configuration.

19 Claims, 10 Drawing Sheets

INTEGRATED POLARIZATION CONVERTER AND FREQUENCY SHIFTER

CROSS REFERENCE TO RELATED APPLICATIONS

This application claims priority under 35 U.S.C. 119(e) to U.S. Provisional Application Ser. No. 62/426,005, "Crystal-Orientation-Optimized Frequency Shifter with Optical Polarization Conversion and Optical Isolation Capability," by Sung-Joo Ben Yoo, Chuan Qin, Burcu Ercan and Hongbo Lu, filed on Nov. 23, 2016, the contents of which are herein incorporated by reference.

GOVERNMENT LICENSE RIGHTS

This invention was made with Government support under Grant No. FA3453-15-1-0006, awarded by the Defense Advanced Research Projects Administration (DARPA). The Government has certain rights in this invention.

BACKGROUND

Field

The described embodiments relate to techniques for performing polarization conversion and frequency shifting an optical signal.

Related Art

Optical frequency shifters have many applications, including: heterodyne sensors, atomic interrogation, light detection and ranging (LIDAR), and coherent optical communications. For many applications, a single-sideband optical frequency shifter may achieve near-complete carrier-suppression and high-conversion efficiency.

In some existing optical frequency shifters, an input circularly polarized light having an initial frequency is shifted and polarization converted by rotating half-wave plate having an angular frequency of rotation. The resulting output circularly polarized light (which is orthogonal to the input circularly polarized light) has an output frequency that is shifted relative to the initial frequency by twice the angular frequency of rotation. However, a mechanically rotating half-wave plate typically cannot attain a high angular frequency of rotation, and thus cannot provide a large frequency shift.

Some other existing optical frequency shifters employ electro-optic modulation at high frequencies, which are operated to emulate a rotating half-wave plate. For example, a 2 GHz electro-optic frequency shift using a lithium niobate in-phase/quadrature (I/Q) modulator has been demonstrated. However, this type of optical frequency shifter often suffers from third-order sideband distortion.

In addition, the electro-optic material in these optical frequency shifters is often based on an X-cut, Z-propagating lithium-niobate alloy. However, because the electro-optic modulation in this orientation is based on a small $r_{22}$ coefficient in an electro-optical tensor of the lithium-niobate alloy, larger amplitude drive signals, and thus, larger power, are usually needed when using these existing optical frequency shifters.

SUMMARY

A described embodiment relates to an optical device. This optical device includes an electro-optic material having a surface. Moreover, the optical device includes: electrodes, disposed on or above the surface, that receive drive signals, and an optical waveguide defined in the electro-optic material and that conveys an optical signal. Furthermore, a Y crystallographic direction of the electro-optical material is parallel to the optical waveguide and an X crystallographic direction of the electro-optical material is parallel to a vertical direction of the optical device, which is substantially perpendicular to the surface. Consequently, the electro-optic material has an X-cut, Y-propagate orientation.

Note that the electro-optic material may be at least one of: lithium niobate, lithium tantalate or barium tantalate. More generally, the electro-optic material may have a trigonal crystal symmetry of a 3 m point group (C3v).

Moreover, the optical waveguide may approximately null birefringence of the electro-optic material. For example, the optical waveguide may include tantalum-infused lithium niobate.

Furthermore, the drive signals may have an angular frequency and the electro-optic material may perform modulation, corresponding to a traveling-wave configuration, of the optical signal based at least in part on the drive signals. The angular frequency of the drive signals may be selected to approximately cancel electro-optic cross terms in X-Z plane of the electro-optical material.

Additionally, an amplitude of the drive signals may be selected so that the optical device emulates a half-wave-plate configuration. Moreover, the drive signals may have a common amplitude, the angular frequency and, respectively, a first phase or a second phase, where the first phase and the second phase may be selected so that a magnitude of the electro-optic modulations of the electro-optic material along two orthogonal directions in an X-Z plane of the electro-optic material (such as a fast axis and a slow axis) are approximately equal.

Note that the modulation may correspond to $r_{13}$, $r_{33}$ and $r_{42}$ coefficients in an electro-optical tensor of the electro-optical material.

Furthermore, an input of the optical waveguide may receive the optical signal having an input circular polarization and an input frequency, and an output of the optical waveguide may provide the optical signal having an output circular polarization that is orthogonal to the input circular polarization and that has an output frequency corresponding to the input frequency and an angular frequency of the drive signals. For example, relative to the input frequency, the output frequency may be shifted by twice the angular frequency.

Additionally, the optical device may modulate the optical signal in a first propagation direction along the optical waveguide and may substantially not modulate the optical signal in a second propagation direction along the optical waveguide, which is opposite to the first propagation direction.

In some embodiments, the optical device may be an integrated polarization converter and frequency shifter. Alternatively or additionally, in some embodiments the optical device may be an optical isolator.

Another embodiment provides an integrated polarization converter and frequency shifter that includes an electro-optic material having an X-cut, Y-propagate orientation.

Another embodiment provides an integrated polarization converter and frequency shifter that includes periodically poled (domain-inverted) regions.

Another embodiment provides an integrated polarization converter and frequency shifter that includes two or more parallel optical paths.

Another embodiment provides a system that includes the optical device.

Another embodiment provides a method for modulating an optical signal, which may be performed by an optical device. During operation, the optical device conveys the optical signal in an optical waveguide, where the optical waveguide is defined in an electro-optic material, and where a Y crystallographic direction of the electro-optical material is parallel to the optical waveguide and an X crystallographic direction of the electro-optical material is parallel to a vertical direction of the optical device. Then, by applying drive signals having an angular frequency to the electro-optic material, the optical device modulates the optical signal, where the modulation corresponds to a traveling-wave configuration, and where the modulation involves a polarization conversion and a frequency shift.

Another embodiment provides an optical isolator. This optical isolator includes an electro-optic material having a surface. Moreover, the optical isolator includes: electrodes, disposed on or above the surface, that receive drive signals, and an optical waveguide defined in the electro-optic material and that conveys an optical signal. The optical isolator modulates, based at least in part on the drive signals, the optical signal in a first propagation direction along the optical waveguide and substantially does not modulate the optical signal in a second propagation direction along the optical waveguide, which is opposite to the first propagation direction.

When the optical signal propagates along the first propagation direction and has an input circular polarization and an input frequency, the optical isolator may output the optical signal having an output circular polarization that is orthogonal to the input circular polarization and that has an output frequency corresponding to the input frequency and an angular frequency of the drive signals. For example, relative to the input frequency, the output frequency may be shifted by twice an angular frequency of the drive signals.

Moreover, an amplitude of the drive signals may be selected so that the optical isolator emulates a half-wave-plate configuration. Furthermore, the drive signals may have a common amplitude, an angular frequency and, respectively, a first phase or a second phase, where the first phase and the second phase may be selected so that a magnitude of the electro-optic modulation of the electro-optic material along two orthogonal directions of the electro-optic material (such as a fast axis and a slow axis) is approximately equal.

In some embodiments, a Y crystallographic direction of the electro-optical material may be parallel to the optical waveguide and an X crystallographic direction of the electro-optical material may be parallel to a vertical direction of the optical isolator, which is substantially perpendicular to the surface. Alternatively, a Z crystallographic direction of the electro-optical material may be parallel to the optical waveguide and an X crystallographic direction of the electro-optical material may be parallel to the vertical direction of the optical isolator, which is substantially perpendicular to the surface. More generally, the electro-optic material in the optical isolator may have an arbitrary orientation.

Another embodiment provides a method for providing optical isolation, which may be performed by the optical isolator.

Another embodiment provides an optical isolator that includes periodically poled (domain-inverted) regions.

Another embodiment provides an optical isolator that includes two or more parallel optical paths.

Another embodiment provides a system that includes the optical isolator.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An optical device is described. This optical device includes an electro-optical material having an X-cut, Y-propagate orientation. In particular, a Y crystallographic direction of the electro-optical material is parallel to an optical waveguide defined in the electro-optic material and an X crystallographic direction of the electro-optical material is parallel to a vertical direction of the optical device. By applying drive signals having an angular frequency to the electro-optic material, the optical device may perform modulation, corresponding to a traveling-wave configuration, of an optical signal based at least in part on the drive signals, where the modulation involves a polarization conversion and a frequency shift. The angular frequency of the drive signals may be selected to approximately cancel electro-optic cross terms in X-Z plane of the electro-optical material. Moreover, an amplitude of the drive signals may be selected so that the optical device emulates a half-waveplate configuration, and phases of the drive signals may be selected so that a magnitude of the electro-optic modulations of the electro-optic material along two orthogonal directions in an X-Z plane of the electro-optic material (such as a fast axis and a slow axis) are approximately equal.

By using the X-cut, Y-propagate configuration, the optical device may perform the modulation based on larger coefficients in an electro-optical tensor of the electro-optical material, such as $r_{33}$ and $r_{42}$. Consequently, the amplitude of the drive signals, and thus, the power may be significantly reduced, such as a drive power that is at least 8× relative to an X-cut, Z-cut configuration. Moreover, the optical device may be used as an integrated polarization converter and frequency shifter and/or an optical isolator, with large frequency shifts and side-lobe suppression. Therefore, the optical device may enable a wide variety of applications.

We now describe some embodiments of a modulation technique. An electro-optic material (such as lithium niobate) driven by in-phase and quadrature sinusoidal signals can completely emulate a rotating half-wave plate. Consequently, an optical device based on this effect can convert input circular polarized light into orthogonally circular polarized light while shifting the optical frequency by a modulation frequency. Moreover, by using an X-cut, Y-propagate configuration, the modulation provided by the optical device may be based on larger coefficients in an electro-optical tensor of electro-optical material, such as $r_{33}$ and $r_{42}$.

In particular, by applying the sum of a common (sinusoidal) drive signal plus a (sinusoidal) differential drive signal to an electrode on top of the electro-optic material and the difference of the common drive signal minus the differential drive signal to another electrode on top of the electro-optic material, the resulting vertical electric field $E_x$ in the electro-optic material may use $r_{42}$ and the lateral electric field $E_z$ in the electro-optic material may use $r_{13}$ and $r_{33}$. Note that the common drive signal may result in the vertical electric field $E_x$ along the X crystallographic direction and the differential drive signal may result in the lateral electric field $E_z$ along the Z crystallographic direction.

When $E_x$ and $E_z$ are present, the index-of-refraction ellipsoid equation may be $$x^2\left(\frac{1}{n_o^2} + r_{13}E_z\right) + z^2\left(\frac{1}{n_e^2} + r_{33}E_z\right) + 2r_{42}E_x xz = 1,$$

where $n_o$ is the ordinary index of refraction and $n_e$ is the extraordinary index of refraction. If the birefringence between the X and Z crystallographic directions is nulled, $n_o$ equals $n_e$. Then, if the X and Z crystallographic directions are rotated by θ to make the cross-term zero, the result is $$\frac{E_z}{E_x} = \frac{2r_{42}\cos(2\theta)}{(r_{13} - r_{33})\sin(2\theta)}.$$

Note that the lateral electric field $E_z$ and the vertical electric field $E_x$ have an amplitude ratio of $$\frac{2r_{42}}{r_{13} - r_{33}}.$$

Moreover, the lateral electric field $E_z$ and the vertical electric field $E_x$ are in-phase and quadrature-phase terms if θ equals $$\frac{\omega_d t}{2},$$

where 2θ represents a counterclockwise rotation angle of the X-Z plane to X' and Z' axes (as shown below with reference to FIG. 1), which are the fast and slow axes of the electro-optic material and $\omega_d$ is the angular frequency of the sinusoidal drive signals.

Moreover, the difference in the index of refraction along the fast and slow axes may be represented using the lateral electric field $E_z$ and the vertical electric field $E_x$ to emulate a rotating wave plate, which results in $$\Delta n \propto n_o^3 \frac{(r_{33} - r_{13})r_{42}}{\sqrt{4r_{42}^2 + (r_{33} - r_{13})^2}} = 10.59 n_o^3.$$

This index-of-refraction difference is 2.85× larger than the index-of-refraction difference refractive index difference with a wave plate based on an X-cut, Z-propagate configuration (which uses the $r_{22}$ coefficient in the electro-optical tensor of electro-optical material).

Figure 1:
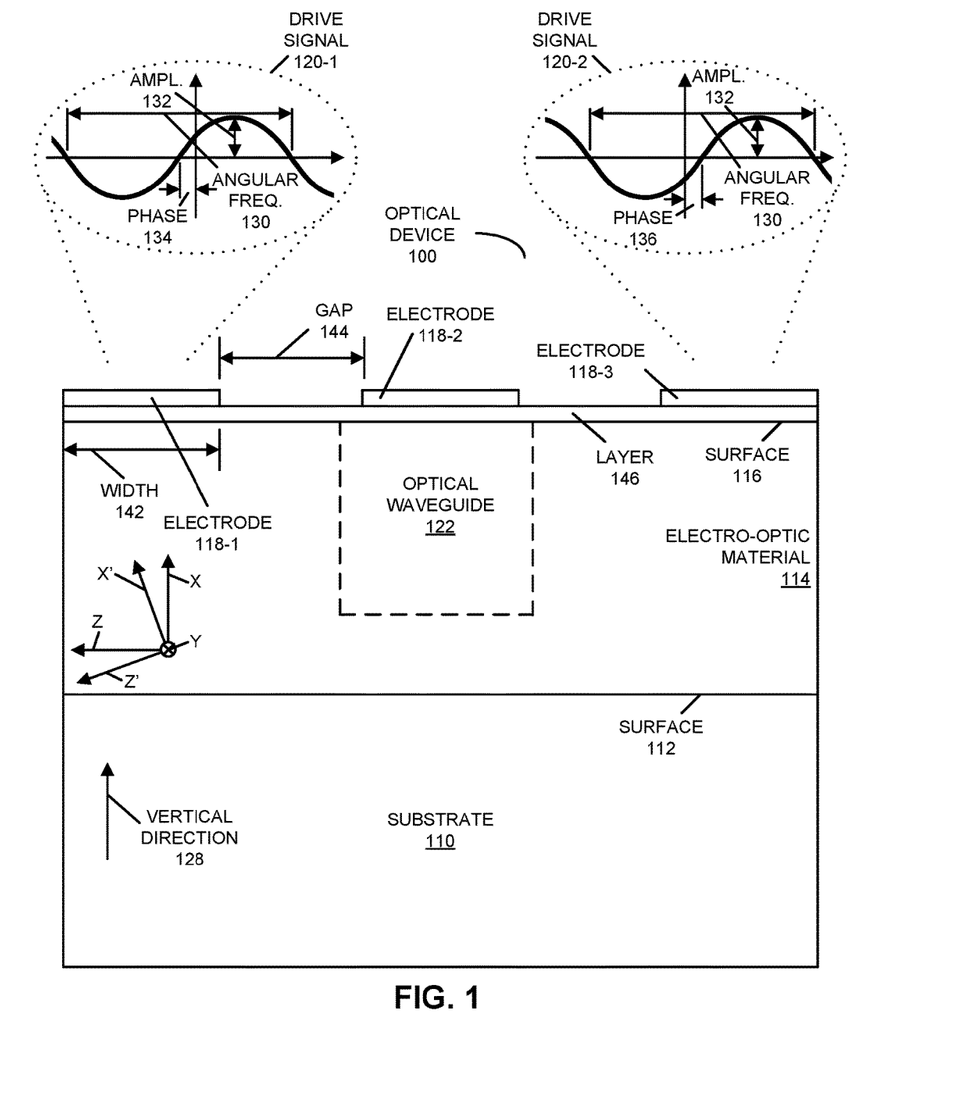
FIG. 1 is a block diagram illustrating a cross-sectional view of an optical device in accordance with an embodiment of the present disclosure.

With this background in mind, we now describe embodiments of an optical device that can perform the modulation technique. FIG. 1 presents a block diagram illustrating an example of a cross-sectional view of an optical device 100. This optical device may include: an optional substrate 110 (such as silicon-on-insulator) having a surface 112, and an electro-optic material 114 disposed on or above surface 112, where the electro-optic material 114 has a surface 116 on an opposite side of electro-optic material 114 from surface 112.

Figure 2:
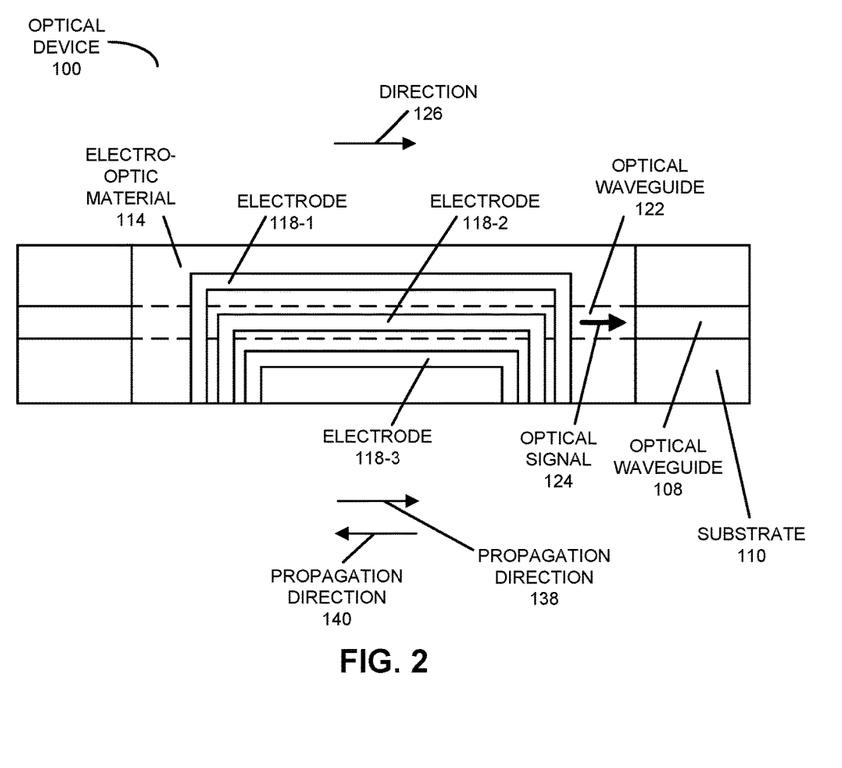
FIG. 2 is a block diagram illustrating a top view of the optical device of FIG. 1 in accordance with an embodiment of the present disclosure.

Moreover, as shown in FIG. 2, which presents a block diagram illustrating an example of a top view of optical device 100, optical device 100 may include: electrodes 118, disposed on or above surface 116 (FIG. 1), that receive drive signals 120 (FIG. 1), and an optical waveguide 122 defined in electro-optic material 114 and that conveys an optical signal 124. For example, electrodes 118 may include two outer electrodes 118-1 and 118-3 that receive drive signals 120 (FIG. 1), and a center electrode 118-2 above optical waveguide 122 that may be electrically coupled to ground. Note that at an output side of optical device 100, electrodes 118 may be an open circuit at DC and may have an AC-coupled termination of 50Ω. In some embodiments, optional substrate 110 includes an optional optical waveguide 108 (such as a silicon-nitride optical waveguide).

Furthermore, a Y crystallographic direction of electro-optical material 114 may be parallel to a direction 126 of optical waveguide 122. Referring back to FIG. 1, an X crystallographic direction of electro-optical material 114 may be parallel to a vertical direction 128 of optical device 100, which is substantially perpendicular to surface 112 (such as within 2.5° of perpendicular). Consequently, electro-optic material 114 may have an X-cut, Y-propagate orientation.

Note that electro-optic material 114 may be at least one of: lithium niobate, lithium tantalate or barium tantalate. More generally, the electro-optic material may have a trigonal crystal symmetry of a 3 m point group (C3v). Moreover, optical waveguide 122 may approximately null birefringence of electro-optic material 114 (such as a difference of less than 0.1% between an ordinary index of refraction and an extraordinary index of refraction). For example, optical waveguide 122 may include tantalum-infused lithium niobate, such as $LiNb_{1-x}Ta_xO_3$ with x between 0.8 and 1, such as x approximately equal to 0.95. Consequently, a DC voltage may not need to be applied to electrodes 118-1 and 118-3 (FIG. 2) to null the birefringence of electro-optic material 114. However, in some embodiments a voltage (such as, e.g., 40 V) is applied across electrodes 118-1 and 118-3 to null the birefringence of electro-optic material 114.

Furthermore, drive signals 120 may have an angular frequency 130 and electro-optic material 114 may perform modulation, corresponding to a traveling-wave configuration, of optical signal 124 (FIG. 2) based at least in part on drive signals 120. Note that angular frequency 130 of drive signals 120 may be selected, at least in part, to approximately cancel electro-optic cross terms in X-Z plane of electro-optical material 114.

Additionally, an amplitude 132 of drive signals 120 may be selected so that optical device 100 emulates a half-waveplate configuration (e.g., with a DC drive signal of 10 V, a transverse-electric linear polarization may be converted into a transverse-magnetic linear polarization). In some embodiments, drive signals 120 may include an in-phase and quadrature drive signals having amplitude 132, or may correspond to a common-mode drive signal and a differential drive signal having amplitude 132. However, because of differences in the distance between electrodes 118, interaction with the optical field, etc., magnitudes of the electric fields along two orthogonal axes in electro-optic material 114 (such as a fast axis and a slow axis or vertical and horizontal axes) may not be the same. The amplitude ratio of the electric fields along the two orthogonal axes in electro-optic material 114 may be adjusted by tuning a phase delay between drive signals 120. Consequently, in some embodiments drive signals 120 may have a common amplitude 132, angular frequency 130 and, respectively, a phase 134 or a phase 136, where phases 134 and 136 may be selected so that a magnitude of the electro-optic modulations of electro-optic material 114 along the two orthogonal directions in an X-Z plane of electro-optic material 114 are approximately equal. For example, drive signals 120 applied to electrodes 118-1 and 118-3, respectively, may be $$V_1 = A\sin(\omega_d t + \phi)$$

and $$V_3 = A\sin(\omega_d t - \phi),$$

Where A is amplitude 132, $\omega_d$ is angular frequency 130, $+\phi$ is phase 134 and $-\phi$ is phase 136. While the preceding embodiments use a common amplitude 132 in drive signals 120, note that in some embodiments drive signals 120 have different amplitudes.

As described previously, the modulation provided by optical device 100 may correspond to $r_{13}$, $r_{33}$ and $r_{42}$ coefficients in an electro-optical tensor of electro-optical material 114. Consequently, amplitude 132 may be reduced, e.g., by at least 2.7× (such as, e.g., an amplitude of 2-3.7V), or a drive power may be reduced by at least 8×.

In some embodiments, optical device 100 may be an integrated polarization converter and frequency shifter. In particular, an input of optical waveguide 122 may receive optical signal 124 (FIG. 2) having an input circular polarization (such as, e.g., right-hand circular polarization) and an input frequency, and an output of optical waveguide 122 may provide the optical signal having an output circular polarization that is orthogonal to the input circular polarization (such as, e.g., left-hand circular polarization) and that has an output frequency corresponding to the input frequency and angular frequency 130 of drive signals 120. For example, relative to the input frequency, the output frequency may be shifted by twice angular frequency 130, such as a frequency shift of 200 MHz, 2 GHz, 10 GHz or more. Note that optical device 100 may have, e.g., an optical extinction ratio that is greater than 18.5 dB and a side-band suppression greater than 20 dB with a −12 or −13 dB conversion efficiency.

In some embodiments, when the input circular polarization is left-hand circular polarization and drive signals 120 result in a clockwise half-wave plate rotation direction as seen from an input to optical device 100, the output circular polarization may be right-hand circular polarization and the output frequency may be up converted relative to the input frequency. Moreover, when the input circular polarization is left-hand circular polarization and drive signals 120 result in a counterclockwise half-wave plate rotation direction as seen from an input to optical device 100, the output circular polarization may be right-hand circular polarization and the output frequency may be down converted relative to the input frequency. Similarly, when the input circular polarization is right-hand circular polarization and drive signals 120 result in a clockwise half-wave plate rotation direction as seen from an input to optical device 100, the output circular polarization may be left-hand circular polarization and the output frequency may be up converted relative to the input frequency. Moreover, when the input circular polarization is right-hand circular polarization and drive signals 120 result in a counterclockwise half-wave plate rotation direction as seen from an input to optical device 100, the output circular polarization may be left-hand circular polarization and the output frequency may be down converted relative to the input frequency.

Alternatively or additionally, in some embodiments optical device 100 may be an optical isolator. For example, as described further below with reference to FIGS. 4-7, optical device 100 may modulate optical signal 124 in, e.g., propagation direction 138 in FIG. 2 along optical waveguide 122 (such as parallel to direction 126 in FIG. 2) and may substantially not modulate optical signal 124 in, e.g., propagation direction 140 in FIG. 2 along optical waveguide 122 (such as antiparallel to direction 126 in FIG. 2), which is opposite to propagation direction 138. For example, the optical modulation in direction 126 in FIG. 2 may be more than 50× larger than the residual optical modulation in direction 140 in FIG. 2.

In order to reduce reflections, note that a facet edge at an input to optical device 100 may be other than perpendicular to the Y crystallographic direction of electro-optical material 114, such as an angle of 8.7° from perpendicular.

While FIGS. 1 and 2 provide a particular configuration of optical device 100, more generally optical device may have a variety of configurations that provide an integrated polarization converter and frequency shifter using electro-optic material 114 having an X-cut, Y-propagate orientation.

In some embodiments, a total length of optical device 100 may be 40 mm and electrodes may have a length of 30 mm. Moreover, electrodes 118 may have, e.g., a width 142 of 6 μm and may be separated from each other by, e.g., 7 μm gaps (such as gap 144). Furthermore, electrodes 118 may be vertically separated from surface 116 of electro-optic material 114 by a layer 146, such as a silicon-dioxide layer having a thickness, e.g., of 200 nm. Additionally, optical waveguide 122 in FIG. 2 may have a 10 μm² cross-sectional area.

Figure 3:
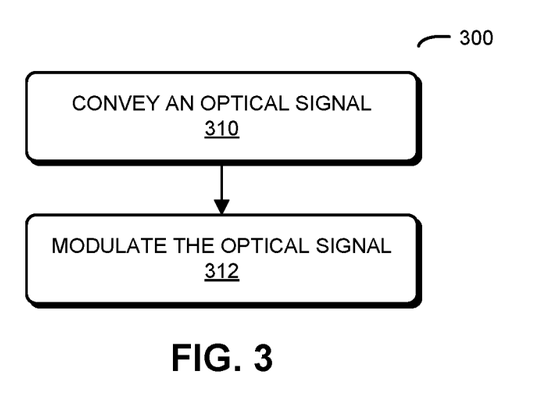
FIG. 3 is a flow diagram illustrating a method for modulating an optical signal in accordance with an embodiment of the present disclosure.

FIG. 3 presents a flow diagram illustrating an example of a method 300 for modulating an optical signal, which may be performed by an optical device, such as optical device 100 (FIGS. 1 and 2). During operation, the optical device may convey the optical signal (operation 310) in an optical waveguide, where the optical waveguide may be defined in an electro-optic material, and where a Y crystallographic direction of the electro-optical material may be parallel to the optical waveguide and an X crystallographic direction of the electro-optical material may be parallel to a vertical direction of the optical device. Then, by applying drive signals having an angular frequency to the electro-optic material, the optical device may modulate the optical signal (operation 312), where the modulation corresponds to a traveling-wave configuration, and where the modulation involves a polarization conversion and a frequency shift.

Figure 4:
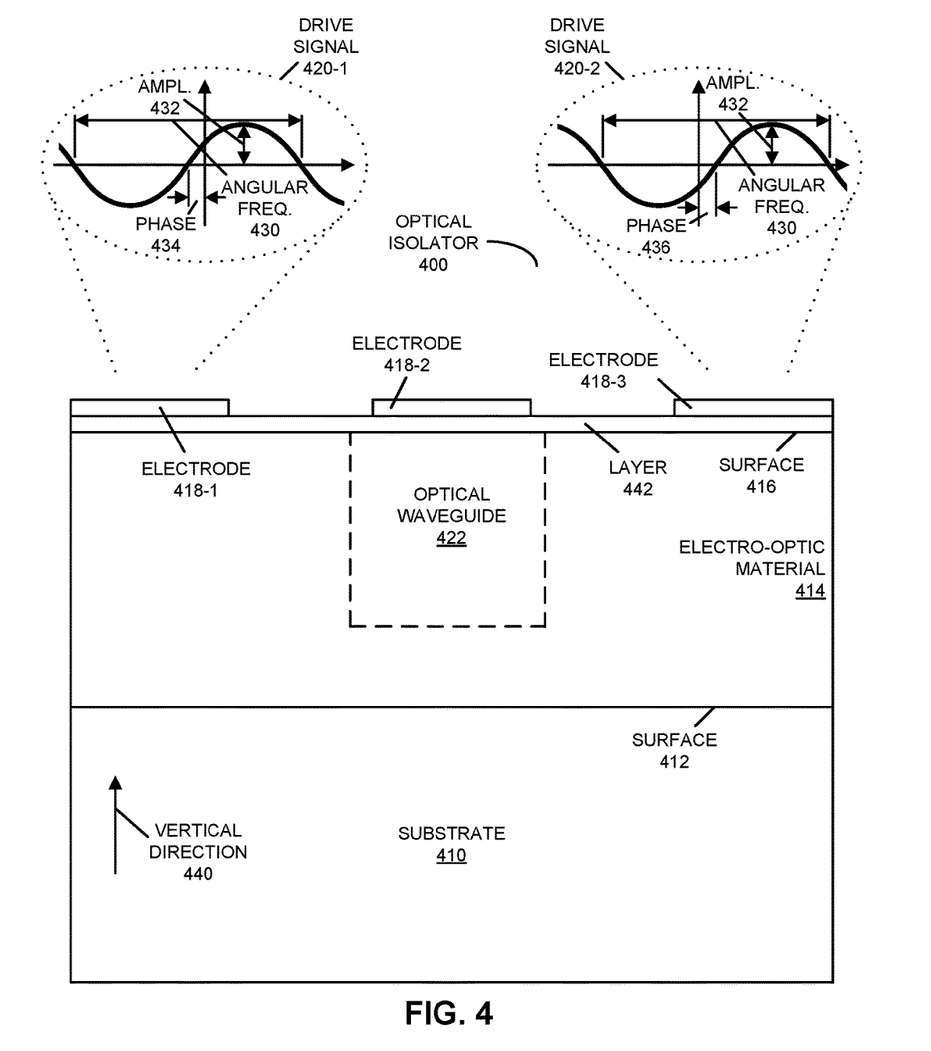
FIG. 4 is a block diagram illustrating a cross-sectional view of an optical isolator in accordance with an embodiment of the present disclosure.

We now describe embodiments of an optical isolator. FIG. 4 presents a block diagram illustrating an example of a cross-sectional view of an optical isolator 400. This optical isolator may include: an optional substrate 410 (such as silicon-on-insulator) having a surface 412, and an electro-optic material 414 disposed on or above surface 412, where electro-optic material 414 has surface 416 on an opposite side of electro-optic material 414 from surface 412.

Figure 5:
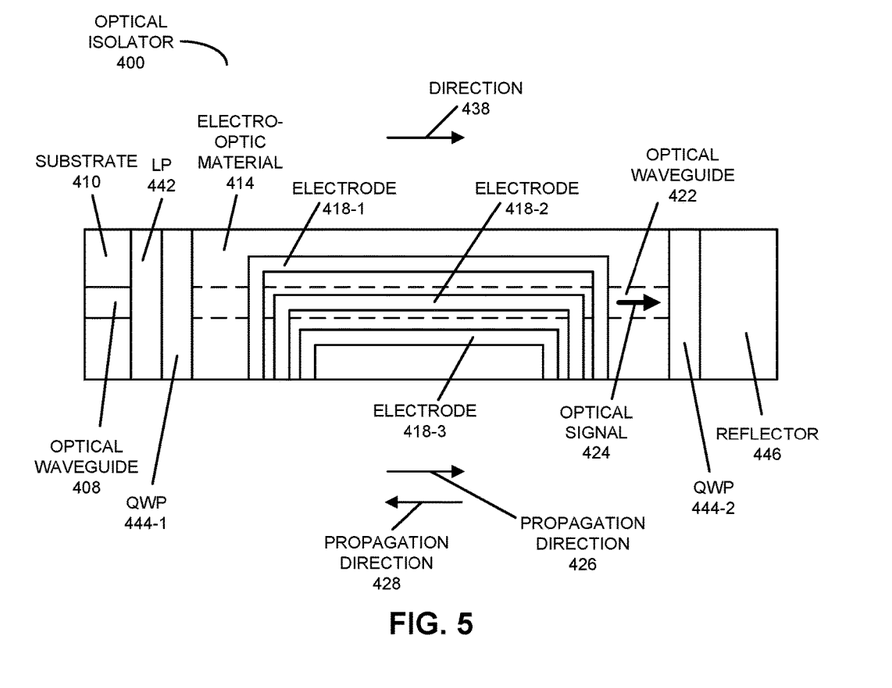
FIG. 5 is a block diagram illustrating a top view of the optical isolator of FIG. 4 in accordance with an embodiment of the present disclosure.

Moreover, as shown in FIG. 5, which presents a block diagram illustrating an example of a top view of optical isolator 400, optical isolator 400 may include: electrodes 418, disposed on or above surface 416 in FIG. 1 (such as above layer 442, e.g., a silicon dioxide layer), that receive drive signals 420 (FIG. 4), and an optical waveguide 422 defined in electro-optic material 414 and that conveys an optical signal 424. In some embodiments, optional substrate 410 includes an optional optical waveguide 408 (such as a silicon-nitride optical waveguide). In some embodiments, electro-optic material has an Y or a Z crystallographic direction along direction 438.

Note that optical isolator 400 may modulate, based at least in part on drive signals 420, optical signal 424 in a propagation direction 426 along optical waveguide 422 and substantially does not modulate optical signal 424 in a propagation direction 428 along optical waveguide 422, which is opposite to propagation direction 426.

When optical signal 424 propagates along, e.g., propagation direction 426 and has an input circular polarization (such as, e.g., right-hand circular polarization) and an input frequency, optical isolator 400 may output optical signal 400 having an output circular polarization that is orthogonal to the input circular polarization (such as, e.g., left-hand circular polarization) and that has an output frequency corresponding to the input frequency and an angular frequency 430 of drive signals 420 in FIG. 4. For example, relative to the input frequency, the output frequency may be shifted by twice angular frequency 430 of drive signals 420 in FIG. 4. As described further below with reference to FIG. 6, optical isolator 400 may include: linear polarizer (LP) 442, quarter-wave plates (QPW) 444 and reflector 446 (such as a mirror).

Referring back to FIG. 4, an amplitude 432 of drive signals 420 may be selected so that optical isolator 400 emulates a half-wave-plate configuration. Furthermore, drive signals 420 may have a common amplitude 432, angular frequency 430 and, respectively, a phase 434 or a phase 436, where phases 434 and 436 may be selected so that a magnitude of the electro-optic modulation of electro-optic material 414 along two orthogonal directions of electro-optic material 414 (such as a fast axis and a slow axis) is approximately equal.

In some embodiments, a Y crystallographic direction of electro-optical material 414 may be parallel to a direction 438 (FIG. 2) of optical waveguide 422 and an X crystallographic direction of electro-optical material 414 may be parallel to a vertical direction 440 of optical isolator 400, which is substantially perpendicular to surface 412 (such as within 2.5° of perpendicular). Alternatively, a Z crystallographic direction of electro-optical material 414 may be parallel to direction 438 (FIG. 2) of optical waveguide 422 and an X crystallographic direction of electro-optical material 414 may be parallel to vertical direction 440 of optical isolator 400, which is substantially perpendicular to surface 412 (such as within 2.5° of perpendicular). More generally, electro-optic material 414 in optical isolator 400 may have an arbitrary orientation and/or may include a wide variety of electro-optic materials, such as at least one of: lithium niobate, lithium tantalite, barium tantalate or a material having a trigonal crystal symmetry of a 3 m point group (C3v).

Figure 6:
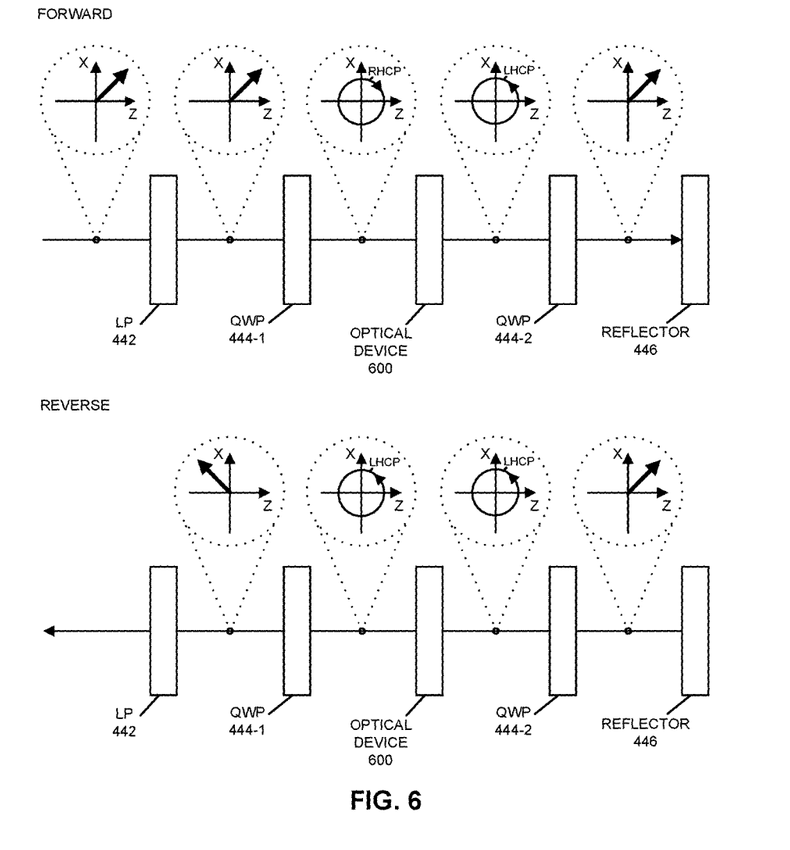
FIG. 6 is a drawing illustrating operation of the optical isolator of FIGS. 4 and 5 in accordance with an embodiment of the present disclosure.

FIG. 6 presents a drawing illustrating an example of operation of optical isolator 400 (FIGS. 4 and 5). In particular, during operation, incident light may be 45° linearly polarized from both the X and Y axes and may be aligned to the input of linear polarizer 442. Then, quarter-wave plate 444-1 may convert the light to right-hand circular polarization (RHCP). Moreover, the light may co-propagate with electrical waves inside an optical waveguide in optical device 600 (such as optical device 100 in FIGS. 1 and 2) and the output polarization state may be left-hand circular polarization (LHCP). Next, quarter-wave plate 444-2 at the output of optical device 600 may convert the light to linear polarization again.

Furthermore, reflector 446 may reflect the light (which may not change the polarization) and quarter-wave plate 444-2 may convert the light to left-hand circular polarization. When the light pass through optical device 600, the modulation may not affect the polarization in principle because the optical and electrical waves propagate in different directions. Consequently, the light may still have left-hand circular polarization when it leaves optical device 600. Then, quarter-wave plate 444-1 may convert the light to linearly polarized light, which is orthogonal to the incident polarization and the polarization of linear polarizer 442. Therefore, the reflected light may be blocked at linear polarizer 442.

In some embodiments, the optical isolator has, e.g., an optical extinction ratio that is greater than 18.5 dB and a side-band suppression greater than 20 dB.

Figure 7:
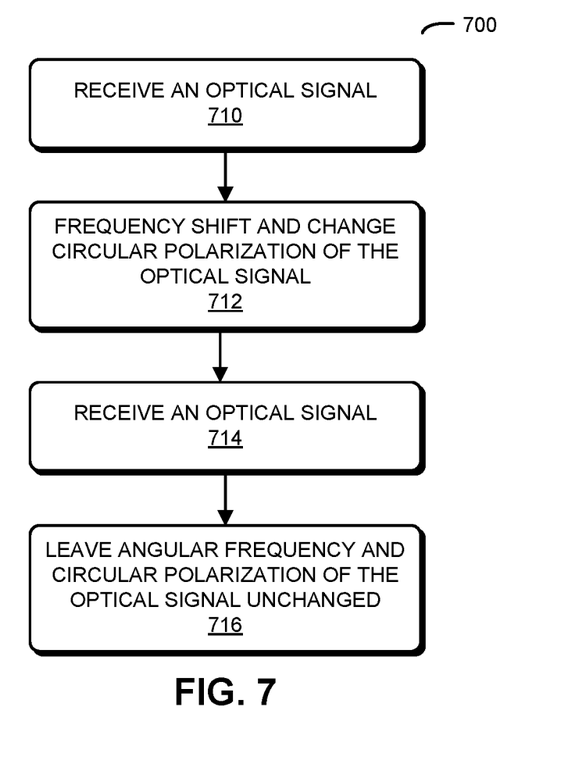
FIG. 7 is a flow diagram illustrating a method for operating an optical isolator in accordance with an embodiment of the present disclosure.

FIG. 7 presents a flow diagram illustrating an example of a method 700 for providing optical isolation, which may be performed by an optical isolator, such as optical isolator 400 (FIGS. 4 and 5). During operation, the optical isolator may receive an optical signal (operation 710) propagating along a first propagation direction, where the optical signal has an input frequency and a first circular polarization (such as right-hand circular polarization). Then, the optical isolator may frequency shift (operation 712) the input frequency of the optical signal and may change circular polarization (operation 712) from the first circular polarization to a second circular polarization, which is opposite to the first circular polarization (such as left-hand circular polarization).

Moreover, the optical isolator may the optical isolator may receive the optical signal (operation 714) propagating along a second propagation direction (which is opposite to the first propagation direction), where the optical signal has an input frequency and the second circular polarization (such as left-hand circular polarization). For example, the optical signal following operation 712 may pass through a quarter-wave plate and may be reflected by a mirror back through the quarter-wave plate into the optical isolator. Next, the optical isolator may substantially not frequency shift the input frequency of the optical signal and may substantially not change the circular polarization from the second circular polarization to the first circular polarization, i.e., the optical isolator may convey the optical signal while leaving an angular frequency and circular polarization substantially unchanged. For example, the optical isolation provided by the optical isolator may be greater than or equal to 18.5 dB.

In some embodiments of methods 300 (FIG. 3) and/or 700, there may be additional or fewer operations. For example, the amplitude and/or phases of the drive signals may be adjusted or optimized for proper operation of the optical device. Additionally, the order of the operations in methods 300 (FIG. 3) and/or 700 may be changed, and/or two or more operations may be combined into a single operation.

Figure 8:
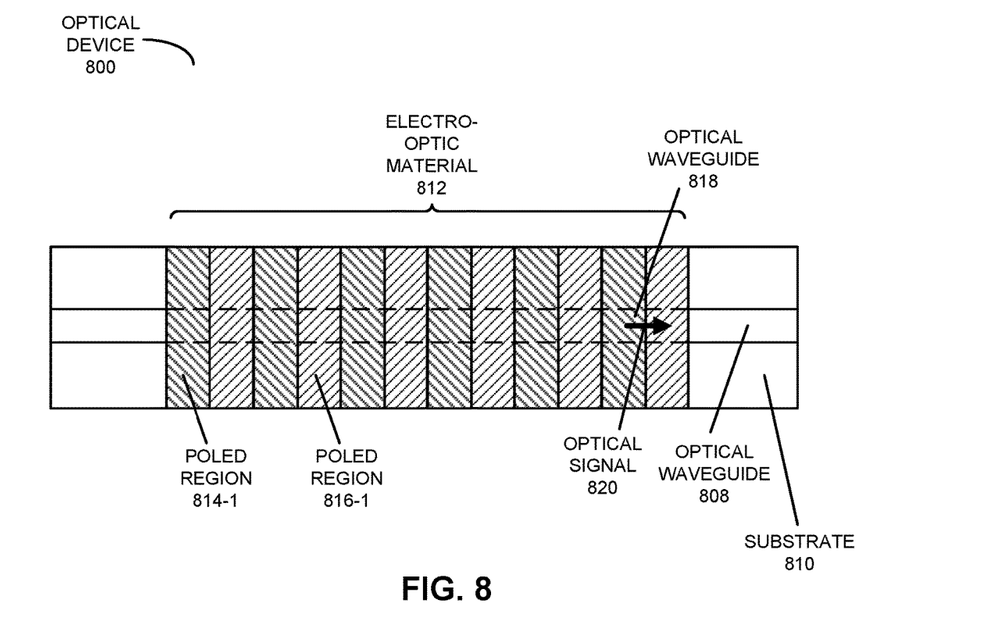
FIG. 8 is a block diagram illustrating a top view of an optical device in accordance with an embodiment of the present disclosure.

We now describe additional embodiments of the optical device, with may be used to reduce the drive signal power to less than 0 dBm by increasing the effective electro-optic effect. FIG. 8 presents a block diagram illustrating an example of a top view of an optical device 800. This optical device includes: an electro-optic material 812 (such as lithium niobate) having periodically poled (domain-inverted) regions (such as poled regions 814-1 and 816-1). These periodically poled regions may have different crystallographic orientations (such as 0° and 45° tilt angles) to exploit the $r_{33}$ or $r_{51}$ coefficients in the electro-optic tensor of electro-optic material 812. Moreover, an optical waveguide 818, which conveys an optical signal 820, may be defined in electro-optic material 812, and electrodes (not shown) may be disposed on or above a top surface of electro-optic material 812. Note that electro-optic material 812 may be disposed on or above optional substrate 810 (such as silicon-on-insulator), and optional substrate 810 may include an optional optical waveguide 808 (such as a silicon-nitride optical waveguide).

Figure 9:
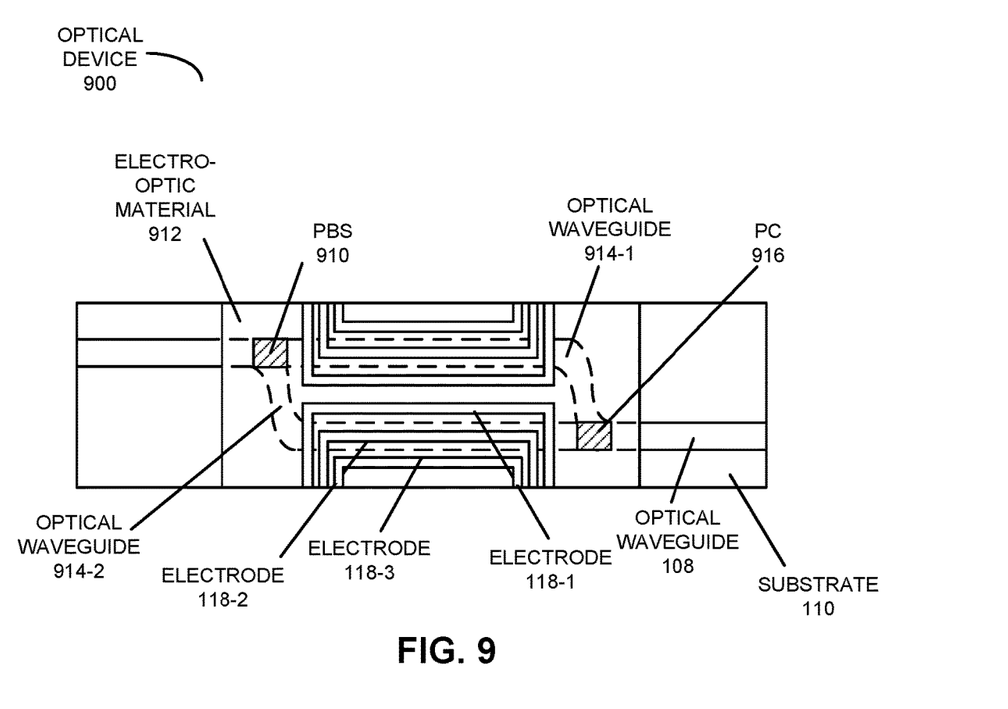
FIG. 9 is a block diagram illustrating a top view of an optical device in accordance with an embodiment of the present disclosure.

FIG. 9 presents a block diagram illustrating an example of a top view of an optical device 900. This optical device may include a polarizing beam splitter (PBS) 910 that splits an input optical signal having an input circular polarization (such as left-hand circular polarization) into transverse-electric and transverse-magnetic polarizations in optical waveguides 914 in two optical paths, and may operate on each of the transverse-electric and transverse-magnetic polarizations. This approach may exploit the large $r_{33}$ coefficient of the electro-optic tensor of electro-optic material 912. At an output of optical device 900, the polarization converted and frequency shifted optical signals in the two paths may be combined by polarization combiner (PC) 916 into an output signal having an output circular polarization (such as right-hand circular polarization).

The optical device and/or the optical isolator in one or more of the preceding embodiments may include additional or fewer components, positions of one or more components may be changed, and/or two or more components may be combined. For example, the optical device and/or the optical isolator may include an optical source, such as a light-emitting diode or a laser (such as a III-V semiconductor laser, e.g., an aluminum-gallium-arsenide semiconductor laser). This optical source may operate at one or more wavelengths, such as at or proximate to: 780 nm, 850 nm, 1100-1700 nm, 1300 and/or 1550 nm.

Moreover, the optical device and/or the optical isolator may include one or more electrical circuits, such as a power supply or a signal generator that provides the drive signals. Furthermore, the optical device and/or the optical isolator may include one or more additional optical components, such as: a photodiode, a diffraction grating, a polarizer, a filter, a polarizing beam splitter, a beam splitter, an acousto-optic modulator, a quarter-wave plate, a lens, a polarization controller, etc.

While the preceding embodiments have been illustrated with particular elements and compounds, a wide variety of materials and compositions (including stoichiometric and non-stoichiometric compositions) may be used, as is known to one of skill in the art. For example, a different substrate material may be used, such as: gallium arsenide, germanium, silicon, silicon germanium, another semiconductor, glass, plastic or another material). Alternatively or additionally, the electro-optic material may include thin-film lanthanum niobate, thin-film lanthanum titanate, thin-film barium titanate and/or a thin film of a material having a trigonal crystal symmetry of a 3 m point group (C3v). Moreover, the optical device and/or the optical isolator may be fabricated using a wide variety of fabrication techniques, such as: evaporation, sputtering, chemical vapor deposition, physical vapor deposition, molecular-beam epitaxy, atomic layer deposition, electron-beam evaporation, wet or dry etching (such as photolithography or direct-write lithography), polishing, etc. Furthermore, the optical device and/or the optical isolator may be fabricated using an additive process that adds material and/or a subtractive process that removes material from the optical device and/or the optical isolator. Note that the materials in the optical device and/or the optical isolator may be amorphous, polycrystalline and/or single crystal.

Additionally, the optical device and/or the optical isolator may be used in a wide variety of applications, such as: a heterodyne sensor, atomic interrogation, LIDAR, optical communication (e.g., in coherent optical communication, in a transceiver, an optical interconnect or an optical link, such as for intra-chip or inter-chip communication), data storage (such as an optical-storage device or system), medicine (such as a diagnostic technique or surgery), and/or metrology (such as precision measurements). For example, the optical device and/or the optical isolator may be used in a tunable receiver, frequency locking, and/or a tunable transmitter (such as a transmitter with a fixed laser source and a frequency shifter that outputs an optical signal having a fundamental frequency in a range of frequencies).

Figure 10:
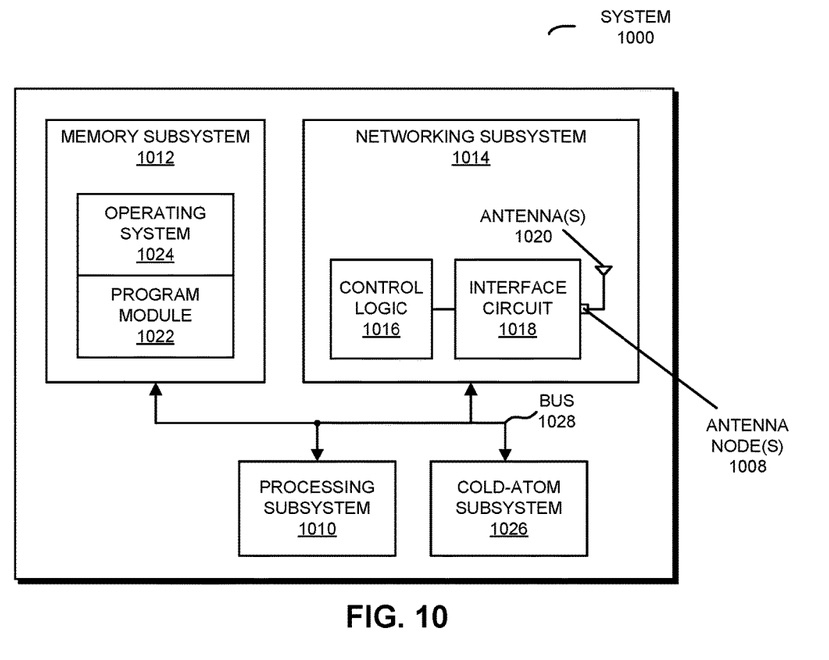
FIG. 10 is a block diagram illustrating a system that includes an optical device in accordance with an embodiment of the present disclosure.

In some embodiments, the optical device and/or the optical isolator are included in a system. This is shown in FIG. 10, which presents a block diagram illustrating an example of a system 1000 that includes an optical device 1008, such as: optical device 100 (FIGS. 1 and 2), optical isolator 400 (FIGS. 4 and 5), optical device 800 (FIG. 8), optical device 900 (FIG. 9) or optical device 1000 (FIG. 10). This system may include processing subsystem 1010, memory subsystem 1012, and networking subsystem 1014. Processing subsystem 1010 includes one or more devices configured to perform computational operations. For example, processing subsystem 1010 can include one or more microprocessors, ASICs, microcontrollers, programmable-logic devices, graphical processor units (GPUs), and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory (which collectively or individually are sometimes referred to as a 'computer-readable storage medium'). In some embodiments, instructions for processing subsystem 1010 in memory subsystem 1012 include: one or more program modules or sets of instructions (such as program module 1022 or operating system 1024), which may be executed by processing subsystem 1010. Note that the one or more computer programs may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that comprises one or more caches coupled to a memory in system 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by system 1000 as fast-access storage for often-used data, while the mass-storage device is used to store less frequently used data.

Networking subsystem 1014 includes one or more devices configured to couple to and communicate on a wired, wireless and/or optical network (i.e., to perform network operations), including: control logic 1016, an interface circuit 1018 and one or more optional antennas 1020 (or antenna elements). (While FIG. 10 includes one or more antennas 1020, in some embodiments system 1000 includes one or more nodes, such as nodes 1008, e.g., a pad, which can be coupled to the one or more antennas 1020. Thus, system 1000 may or may not include the one or more antennas 1020.) For example, networking subsystem 1014 can include a Bluetooth networking system, a cellular networking system (e.g., a 3G/4G network such as UMTS, LTE, etc.), a USB networking system, a networking system based on the standards described in IEEE 802.10 (e.g., a Wi-Fi networking system), an Ethernet networking system, and/or another networking system.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system.

Within system 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, system 1000 includes a cold-atom subsystem 1026 for storing atoms, e.g., in a vapor cell. While not shown in FIG. 10, in some embodiments system 1000 includes a display subsystem for displaying information on a display, which may include a display driver and the display, such as a liquid-crystal display, a multi-touch touchscreen, etc.

System 1000 can be (or can be included in) any system with at least one network interface. For example, system 1000 can be (or can be included in): a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal or desktop computer, a work station, a mainframe computer, a cloud-based computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a smartwatch, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Although specific components are used to describe system 1000, in alternative embodiments, different components and/or subsystems may be present in system 1000. For example, system 1000 may include one or more additional processing subsystems, memory subsystems, networking subsystems, and/or display subsystems. Additionally, one or more of the subsystems may not be present in system 1000. Moreover, in some embodiments, system 1000 may include one or more additional subsystems that are not shown in FIG. 10. Also, although separate subsystems are shown in FIG. 10, in some embodiments some or all of a given subsystem or component can be integrated into one or more of the other subsystems or component(s) in system 1000. For example, in some embodiments program module 1022 is included in operating system 1024 and/or control logic 1016 is included in interface circuit 1018.

Moreover, the circuits and components in system 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of system 1000. In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the modulation technique may be implemented using program module 1022, operating system 1024 (such as a driver for interface circuit 1018), in firmware and/or in hardware.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the modulation technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device, comprising:
   an electro-optic material having a surface;
   electrodes, disposed on or above the surface, configured to receive drive signals; and
   an optical waveguide defined in the electro-optic material and configured to convey an optical signal, wherein a Y crystallographic direction of the electro-optical material is parallel to the optical waveguide and an X crystallographic direction of the electro-optical material is parallel to a vertical direction of the optical device, which is substantially perpendicular to the surface;
   wherein the optical device comprises an integrated polarization converter and frequency shifter; and
   wherein an angular frequency of the drive signals is selected to approximately cancel electro-optic cross terms in X-Z plane of the electro-optical material.

2. The optical device of claim 1, wherein the electro-optic material has a trigonal crystal symmetry of a 3m point group.

3. The optical device of claim 1, wherein the optical waveguide is configured to approximately null birefringence of the electro-optic material.

4. The optical device of claim 1, wherein the drive signals have an angular frequency and the electro-optic material is configured to perform modulation, corresponding to a traveling-wave configuration, of the optical signal based at least in part on the drive signals.

5. The optical device of claim 4, wherein the modulation corresponds to $r_{13}$, $r_{33}$ and $r_{42}$ coefficients in an electro-optical tensor of the electro-optical material.

6. The optical device of claim 1, wherein an input of the optical waveguide is configured to receive the optical signal having an input circular polarization and an input frequency, and an output of the optical waveguide is configured to provide the optical signal having an output circular polarization that is orthogonal to the input circular polarization and that has an output frequency corresponding to the input frequency and an angular frequency of the drive signals.

7. The optical device of claim 1, wherein an amplitude of the drive signals is selected so that the optical device emulates a half-wave-plate configuration.

8. The optical device of claim 1, wherein the optical device comprises an optical isolator.

9. The optical device of claim 1, wherein the optical device is configured to modulate the optical signal in a first propagation direction along the optical waveguide and is configured to substantially not modulate the optical signal in a second propagation direction along the optical waveguide, which is opposite to the first propagation direction.

10. The optical device of claim 1, wherein the drive signals have a common amplitude, an angular frequency and, respectively, a first phase or a second phase; and
    wherein the first phase and the second phase are selected so that a magnitude of the electro-optic modulations of the electro-optic material along two orthogonal directions in an X-Z plane of the electro-optic material are approximately equal.

11. A method for modulating an optical signal, comprising:
    conveying the optical signal in an optical waveguide in an optical device, wherein the optical waveguide is defined in an electro-optic material, and wherein a Y crystallographic direction of the electro-optical material is parallel to the optical waveguide and an X crystallographic direction of the electro-optical material is parallel to a vertical direction of the optical device;
    modulating the optical signal by applying drive signals having an angular frequency to the electro-optic material, wherein the modulation corresponds to a traveling-wave configuration, and wherein the modulation involves a polarization conversion and a frequency shift; and
    selecting an angular frequency of the drive signals to approximately cancel electro-optic cross terms in X-Z plane of the electro-optical material.

12. The method of claim 11, wherein the electro-optic material has a trigonal crystal symmetry of a 3m point group.

13. The method of claim 11, wherein the optical device comprises an optical isolator.

14. An optical isolator, comprising:
    an electro-optic material having a surface;
    electrodes, disposed on or above the surface, configured to receive drive signals; and an optical waveguide defined in the electro-optic material and configured to convey an optical signal, wherein the optical isolator is configured to modulate, based at least in part on the drive signals, the optical signal in a first propagation direction along the optical waveguide and is configured to substantially not modulate the optical signal in a second propagation direction along the optical waveguide, which is opposite to the first propagation direction, and wherein an angular frequency of the drive signals is selected to approximately cancel electro-optic cross terms in X-Z plane of the electro-optical material.

15. The optical isolator of claim 14, wherein, when the optical signal propagates along the first propagation direction and has an input circular polarization and an input frequency, the optical isolator is configured to output the optical signal having an output circular polarization that is orthogonal to the input circular polarization and that has an output frequency corresponding to the input frequency and an angular frequency of the drive signals.

16. The optical isolator of claim 14, wherein an amplitude of the drive signals is selected so that the optical isolator emulates a half-wave-plate configuration.

17. The optical isolator of claim 14, wherein the drive signals have a common amplitude, an angular frequency and, respectively, a first phase or a second phase; and
wherein the first phase and the second phase are selected so that a magnitude of the electro-optic modulation of the electro-optic material along two orthogonal directions of the electro-optic material is approximately equal.

18. The optical isolator of claim 14, wherein a Y crystallographic direction of the electro-optical material is parallel to the optical waveguide and an X crystallographic direction of the electro-optical material is parallel to a vertical direction of the optical isolator, which is substantially perpendicular to the surface.

19. The optical isolator of claim 14, wherein a Z crystallographic direction of the electro-optical material is parallel to the optical waveguide and an X crystallographic direction of the electro-optical material is parallel to a vertical direction of the optical isolator, which is substantially perpendicular to the surface.

* * * * *